United States Patent
Unterweger et al.

(10) Patent No.: US 11,358,518 B2
(45) Date of Patent: Jun. 14, 2022

(54) LIGHT FUNCTION CONTROL REDUNDANCY WHEN CHANGING THE LIGHT INTENSITY OF PIXELATED VEHICLE HEADLAMPS

(71) Applicant: Infineon Technologies AG, Neubiberg (DE)

(72) Inventors: Gernot Unterweger, Latschach (AT); Adolfo De Cicco, Castel d'Azzano (IT); Pietro Vallese, Padua (IT); Andrea Scenini, Montegrotto Terme (IT)

(73) Assignee: Infineon Technologies AG, Nuebiberg (DE)

( * ) Notice: Subject to any disclaimer, the term of this patent is extended or adjusted under 35 U.S.C. 154(b) by 0 days.

(21) Appl. No.: 17/064,526

(22) Filed: Oct. 6, 2020

(65) Prior Publication Data
US 2022/0105862 A1    Apr. 7, 2022

(51) Int. Cl.
*B60Q 1/14*    (2006.01)
*H05B 45/14*    (2020.01)

(52) U.S. Cl.
CPC .......... *B60Q 1/1407* (2013.01); *H05B 45/14* (2020.01); *B60Q 2300/054* (2013.01)

(58) Field of Classification Search
CPC ........ B60Q 1/1407; B60Q 1/143; B60Q 1/16; B60Q 2300/054; H05B 45/10; H05B 45/14
See application file for complete search history.

(56) References Cited

U.S. PATENT DOCUMENTS

| | | | |
|---|---|---|---|
| 8,791,647 B2 | 7/2014 | Kesterson et al. | |
| 8,947,343 B2 | 2/2015 | Kim et al. | |
| 9,041,310 B2 | 5/2015 | Lin et al. | |
| 9,445,475 B1 | 9/2016 | Sutardja et al. | |
| 9,820,343 B1 | 11/2017 | Fragiacomo et al. | |
| 10,085,314 B1 | 9/2018 | Milanesi et al. | |
| 10,264,637 B2 | 4/2019 | van de Ven et al. | |
| 10,560,990 B1 | 2/2020 | Fragiacomo et al. | |
| 2020/0084854 A1* | 3/2020 | Bonne | H05B 45/10 |
| 2020/0114805 A1* | 4/2020 | Ridler | B60Q 1/085 |
| 2021/0162916 A1* | 6/2021 | Ikenouchi | G06K 9/2027 |

OTHER PUBLICATIONS

Szolusha et al., "Single 2 MHz Buck-Boost Controller Drives Entire LED Headlight Cluster, Meets CISPR 25 Class 5 EMI," Analog Dialogue, May 2018, 6 pp.

* cited by examiner

*Primary Examiner* — Alexander H Taningco
*Assistant Examiner* — Pedro C Fernandez
(74) *Attorney, Agent, or Firm* — Shumaker & Sieffert, P.A.

(57) ABSTRACT

A vehicle headlamp control circuit may be configured to control a vehicle headlamp comprising a plurality of lighting elements. The vehicle headlamp control circuit may comprise a first communication interface configured to receive a first signal comprising a first set of values for driving the plurality of lighting elements, and a second communication interface configured to receive a second signal comprising an intensity threshold. The circuit may be configured to determine a composite intensity associated with the first set of values and drive the plurality of lighting elements using the first set of values if the composite intensity associated with the first set of values satisfies the intensity threshold.

21 Claims, 9 Drawing Sheets

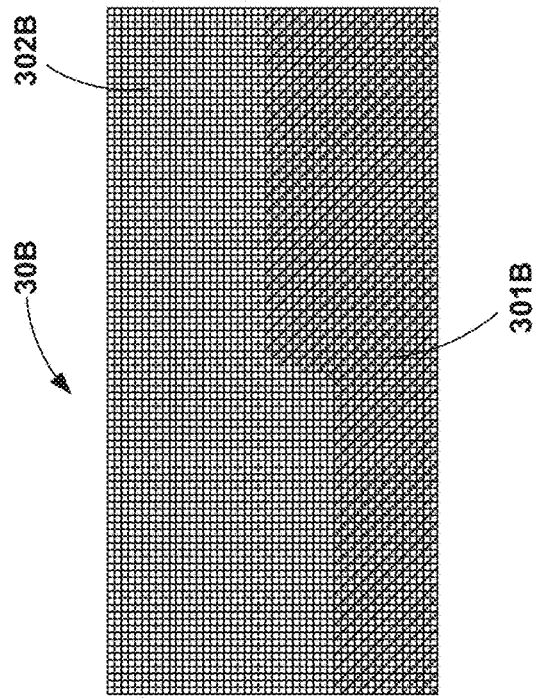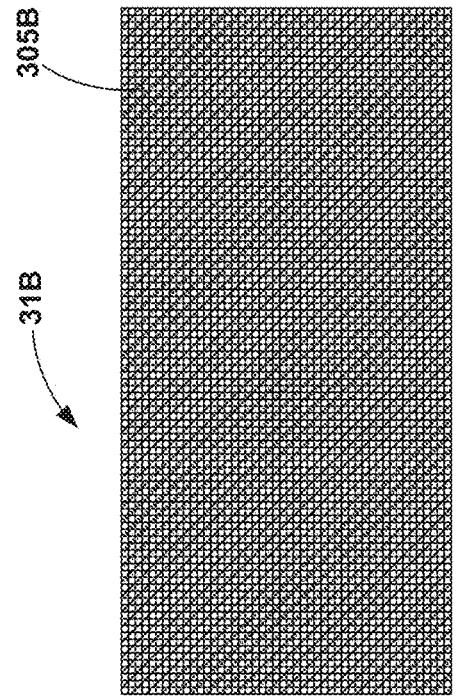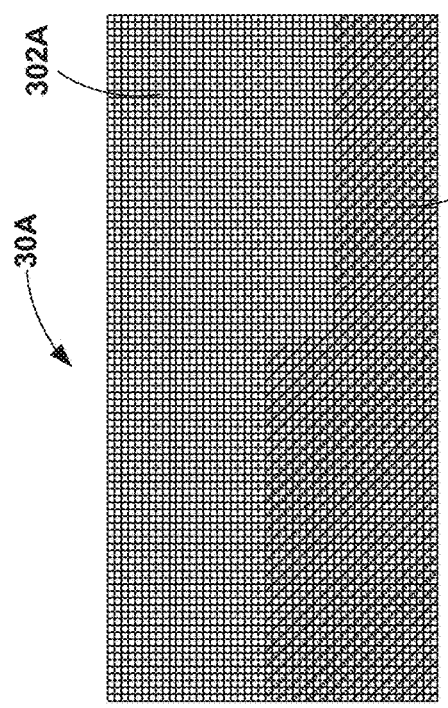
FIG. 3A
FIG. 3B

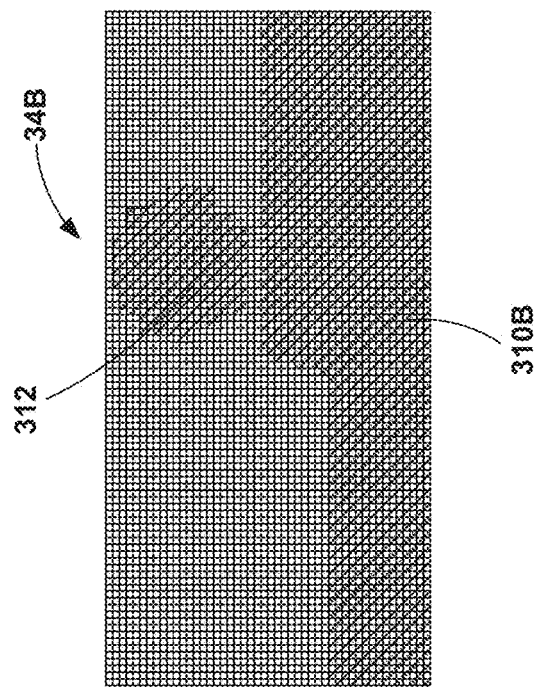
FIG. 3E
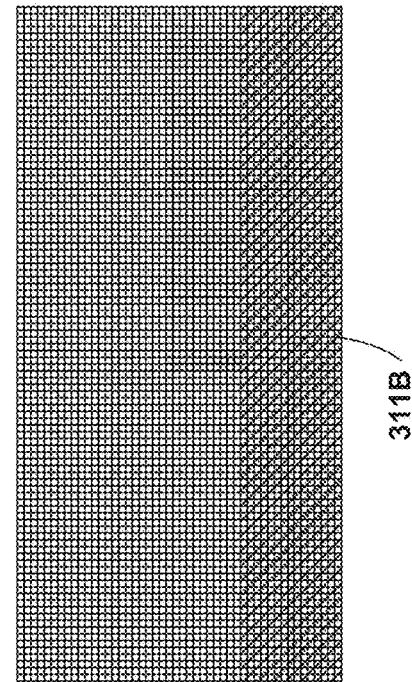
FIG. 3F
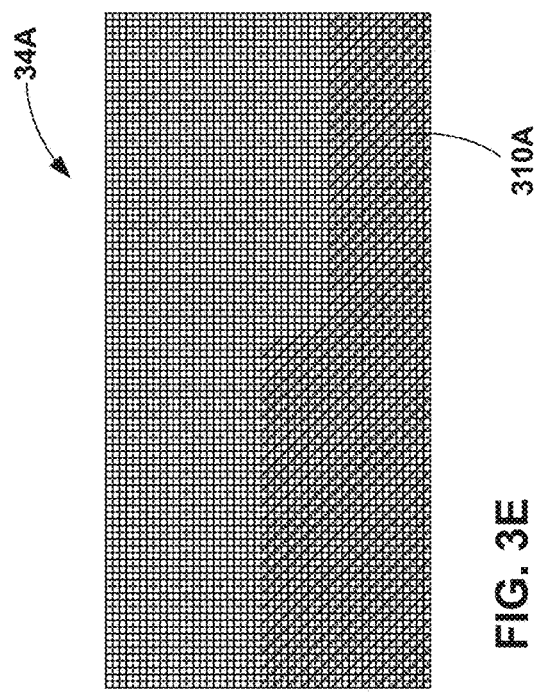
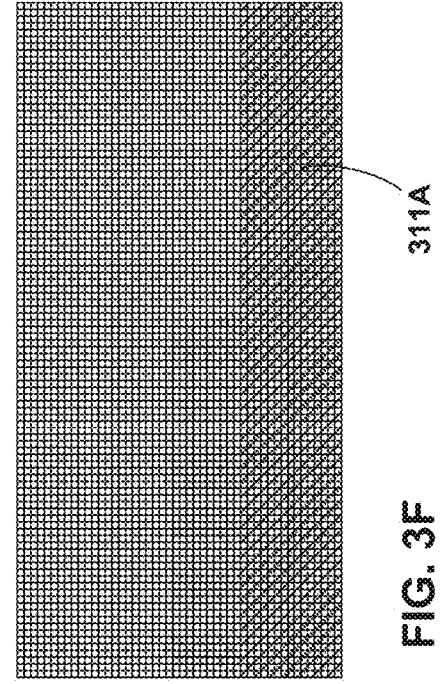

… (1) …

LIGHT FUNCTION CONTROL REDUNDANCY WHEN CHANGING THE LIGHT INTENSITY OF PIXELATED VEHICLE HEADLAMPS

TECHNICAL FIELD

This disclosure relates to circuits for driving and controlling pixelated light sources, such as for a vehicle headlamp comprising a matrix of light emitting diodes (LEDs) or other light sources that comprises a plurality of lighting elements that are individually controllable.

BACKGROUND

Drivers are often used to control a voltage, current, or power at a load. For instance, a light emitting diode (LED) driver may control the power supplied to a set of light emitting diodes. Some drivers may comprise a DC to DC power converter, such as a buck-boost, buck, boost, or another DC to DC converter. These or other types of DC to DC power converters may be used to control and possibly change the power at the load based on a characteristic of the load. DC to DC power converters may be especially useful for LED drivers to regulate current through LED strings.

Some LED circuits include a large number of individually controllable LEDs arranged in a two-dimensional matrix. The individually controllable LEDs can be driven so as to provide different lighting (e.g., high beam or low beam lighting) for different driving conditions, or to provide advanced lighting effects. Advanced vehicle headlamp systems, for example, are one example application of such LED circuits, whereby lighting effects associated with vehicle operation can be used to improve the driving experience and to promote vehicle safety.

SUMMARY

In general, this disclosure is directed to circuits used for controlling and driving a pixelated light source used for advanced vehicle headlamp systems, such as a matrix of light emitting diodes (LEDs), a matrix of digital micromirror devices (DMDs), combinations of LEDs and DMDs, or other types of lighting elements that are individually controllable. The circuits may be used to control the lighting elements in order to control changes from low beam lighting to high beam lighting, or to control changes from low beam lighting to any other mode that implements advanced lighting effects. According to this disclosure, changes in pixel light source illumination (such as from a low beam mode to a different mode) may include a redundancy check to ensure that the output intensity of light does not exceed an intensity threshold.

The circuits and techniques may be useful for changes from a low beam mode (or another safe lighting mode) to any other illumination mode that defines a higher intensity of light. The described techniques can help to ensure that high light output is avoided in situations where errors may be present in the data used to drive LEDs. In this way, an accidental change from a low beam mode (or another safe lighting mode) to a high beam mode or another illumination mode with higher intensity than the low beam mode can be avoided so as to promote safety and to avoid undesirable glare to oncoming traffic. The redundancy check can add an additional level of safety to headlamp changes, which may be useful for vehicle headlamp operation. In still other examples, the techniques of this disclosure may also be used for changes from a high light output mode to a lower light output mode, in which case an expected light intensity can be checked to confirm that it is below an intensity threshold In one example, a vehicle headlamp control circuit may be configured to control a vehicle headlamp comprising a plurality of lighting elements. The vehicle headlamp control circuit may comprise a first communication interface configured to receive a first signal comprising a first set of values for driving the plurality of lighting elements, and a second communication interface configured to receive a second signal comprising an intensity threshold. The vehicle headlamp control circuit may be configured to determine a composite intensity associated with the first set of values and drive the plurality of lighting elements using the first set of values if the composite intensity associated with the first set of values satisfies the intensity threshold. In some examples, the composite intensity satisfies the intensity threshold when the composite intensity is greater than the threshold. In other examples, the composite intensity satisfies the intensity threshold when the composite intensity is less than the threshold. Accordingly, the vehicle headlamp control circuit may be configured to control changes from low intensity light output (e.g., a low beam lighting mode) to high intensity light output (e.g., a high beam lighting mode) or vice versa. In addition, the vehicle headlamp control circuit may also control other types of lighting changes or effects as described in greater detail below.

In another example, this disclosure describes a method of controlling a vehicle headlamp. The method may comprise receiving a first signal that comprises a first set of values for driving a plurality of lighting elements of the vehicle headlamp, receiving a second signal comprising an intensity threshold, determining a composite intensity associated with the first set of values, and driving the plurality of lighting elements using the first set of values if the composite intensity associated with the first set of values satisfies the intensity threshold.

In another example, this disclosure describes a headlamp unit for a vehicle, the headlamp unit comprising a plurality of lighting elements, and a vehicle headlamp control circuit configured to control the plurality of lighting elements. The vehicle headlamp control circuit may comprise a first communication interface configured to receive a first signal comprising a first set of values for driving the plurality of lighting elements, and a second communication interface configured to receive a second signal comprising an intensity threshold. The vehicle headlamp control circuit may be configured to determine a composite intensity associated with the first set of values, drive the plurality of lighting elements using the first set of values if the composite intensity associated with the first set of values satisfies the intensity threshold, and drive the plurality of LEDs using a second set of values if the composite intensity associated with the first set of values does not satisfy the intensity threshold.

Details of these and other examples are set forth in the accompanying drawings and the description below. Other features, objects, and advantages will be apparent from the description and drawings, and from the claims.

BRIEF DESCRIPTION OF DRAWINGS

FIGS. 3A-3F are conceptual diagrams of left-side and right-side vehicle headlamps in some example lighting modes where different sets of LEDs are active.

DETAILED DESCRIPTION

Figure 1:
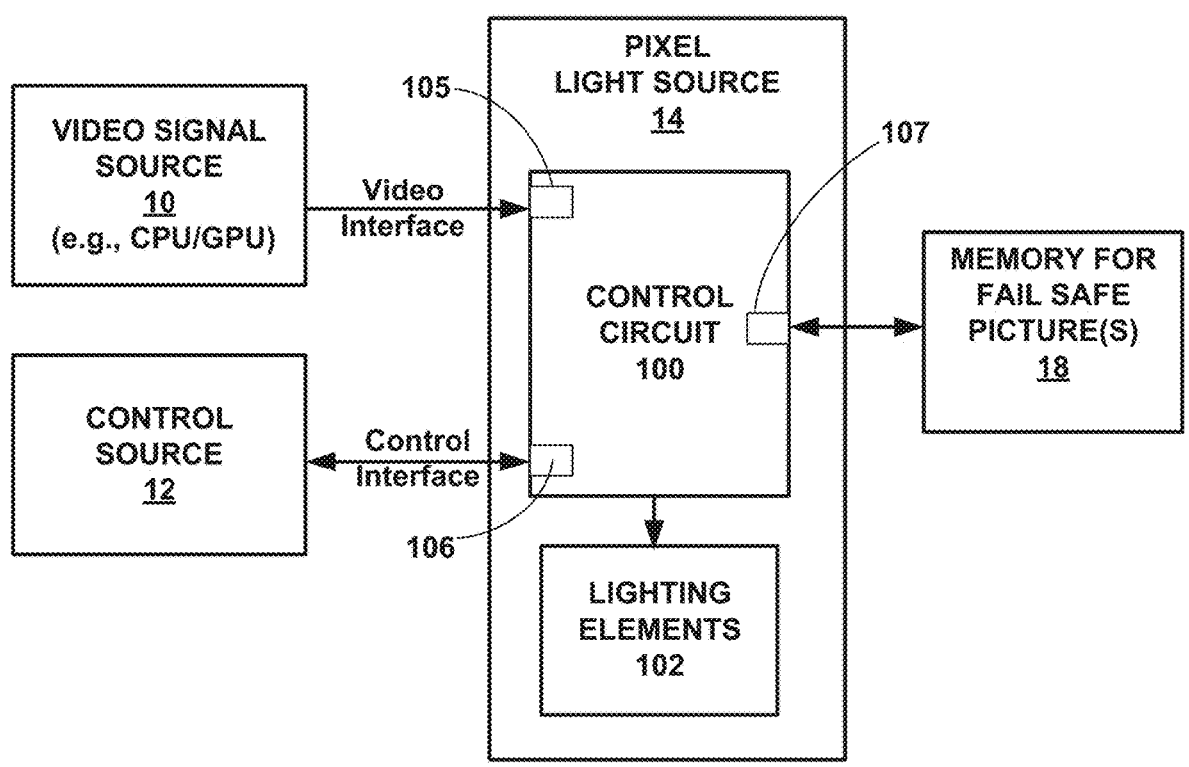
FIG. 1 is a block diagram illustrating a pixel light source including a control circuit that is controlled on the basis of two different inputs.

This disclosure is directed to circuits useful for advanced vehicle headlamp systems. The circuits may be used to control and drive lighting elements, such as light emitting diodes (LEDs), digital micromirror devices (DMDs), combinations of LEDs and DMDs, or other types of lighting elements that are individually controllable. In particular, the circuits may provide control redundancy when changing lighting modes, such as when changing from a low beam lighting mode to a high beam lighting mode, or vice versa. Also, the circuits may also be used to control changes from a normal lighting mode (e.g., low beam or high beam) to an advanced lighting mode such as with advanced lighting effects, or vice versa. The control redundancy may promote vehicle safety and help reduce or eliminate unwanted or undesirable changes in lighting modes.

For example, the circuits may control and drive lighting elements to achieve lighting mode changes, such as to achieve brightness increases from low beam to high beam, to achieve brightness decreases from high beam to low beam, to shape light output so as to achieve glare reductions perceived by the operators of other vehicles, to enhance illumination of one or more objects, to adjust or project visual aids or guiding elements in order to help the vehicle operator, to project one or more symbols, to project guiding lines for the vehicle operator, to shape light projected by the LEDs, to increase light intensity of a portion of light projected by the LEDs, or to achieve other effects.

Lighting adjustments according to this disclosure may comprise adjustments from a low beam mode to a high beam mode (or vice versa) based on user control, or the adjustments may be more advanced, and possibly performed based on road information, road hazard information, images of the road, and/or navigation information collected or presented by the vehicle. For example, the lighting adjustments may be based on object detection, or based on other factors. In some cases, a vehicle may be equipped with cameras that can capture real-time video, which can be processed in real-time to perform such object detection and adaptive lighting control.

According to this disclosure, any change in headlamp illumination by a pixelated light source (such as from a low beam mode to a different mode) may include a redundancy check to ensure that the output intensity of light does not exceed an intensity threshold. In some examples, the circuits and techniques may be useful for changes from a low beam mode (or another safe lighting mode) to any other illumination mode that defines a higher intensity of light than the low beam mode, such as a high beam mode, an advanced illumination mode, an object illumination mode, a road line illumination mode, or any other mode where the LEDs are illuminated to a higher intensity of light that that of the low beam mode.

The described techniques can help to ensure that high light output is avoided in situations where errors may be present in the data used to drive LEDs. In this way, an accidental change from a low beam mode (or another safe lighting mode) to a high beam mode or another illumination mode within higher intensity than the low beam mode can be avoided so as to promote safety and to avoid undesirable glare to oncoming traffic. The redundancy check can add an additional level of safety to headlamp changes, which may be useful for vehicle headlamp operation. Again, in still other examples, the techniques of this disclosure may also be used for changes from a high light output mode to a lower light output mode, in which case an expected light intensity can be checked to confirm that it is below the intensity threshold.

FIG. 1 is a block diagram illustrating a pixel light source 14 including a vehicle headlamp control circuit 100 that is controlled on the basis of two different inputs. Pixel light source 14 may including lighting elements 102, such as a matrix of individually controllable LEDs, individually controllable DMDs, combinations of LEDs and DMDs, or other types of lighting elements that are individually controllable. For example, lighting elements may comprise a plurality of individually controllable LEDs arranged in a two-dimensional matrix to define the vehicle headlamp, a plurality of individually controllable lighting elements that comprise micro mirrors arranged in a two-dimensional matrix to define the vehicle headlamp, or combinations thereof.

Vehicle headlamp control circuit 100 may include two or more different interfaces configured to receive signals used to control lighting elements 102. In particular, a first communication interface 105 may be configured to receive a first signal comprising a first set of values for driving lighting elements 102. First communication interface 105 may comprise a video interface configured to receive video frames or pictures, which may comprise bitmaps of intensity values used for a plurality of different lighting elements 102. The bitmaps may be generated by video signal source 10, which may comprise a processor such as a central processing unit (CPU), a graphics processing unit (GPU), or another processor.

In some situations, one or more bitmaps received via first communication interface 105 may have errors or incorrect data. Therefore, to account for possible errors in bitmap data and in order to avoid unintentional changes in light output by lighting elements 102, vehicle headlamp control circuit 100 may be configured to provide control redundancy when changing lighting modes, such as when changing from a low beam lighting mode to a high beam lighting mode, or vice versa. In particular, vehicle headlamp control circuit 100 may include a second communication interface 106 configured to receive a second signal comprising an intensity threshold. The intensity threshold may be delivered over a separate control interface (e.g., separate from the video interface used to deliver the bitmaps to control circuit 100). The intensity threshold may define threshold of total current, a duty cycle, a brightness level, or another value indicative of light output intensity. The intensity threshold may be sent to control circuit 100 from a control source 12, which may comprise a microcontroller. Although video signal source 10 and control source 12 are shown as separate components, in some examples, video signal source 10 and control source 12 could also be implemented as separate software routines on the same processor. Accordingly, source 12 may comprise a controller that is separate from video signal source 10, or one common processor may be used to implement both video signal source 10 and control source 12 as separate software algorithms that deliver the two different signals to vehicle headlamp control circuit 100.

Vehicle headlamp control circuit 100 may be configured to determine a composite intensity associated with the first set of values received via first communication interface 105 (e.g., a composite intensity associated with the bitmap) and drive the plurality of lighting elements 102 using the first set of values if the composite intensity associated with the first set of values satisfies the intensity threshold that is received over second communication interface 106. In this way, control redundancy can be achieved to help avoid unwanted or undesirable changes in light output by lighting elements. To control changes from a lower light output mode to a higher light output mode, for example, vehicle headlamp control circuit 100 may be configured to drive the plurality of lighting elements 102 using the first set of values if the composite intensity associated with the first set of values is greater than the intensity threshold. Alternatively, to control changes from a higher light output mode to a lower light output mode, vehicle headlamp control circuit 100 may be configured to drive the plurality of lighting elements 102 using the first set of values if the composite intensity associated with the first set of values is less than the intensity threshold. Thus, the phrase "satisfy the intensity threshold" may refer to either of these situations where the composite intensity is either greater than the intensity threshold, or alternatively, less than the intensity threshold Vehicle headlamp control circuit 100 may also be coupled to a memory 18, which may store one or more fail safe pictures or bitmaps. Memory 18 may be part of vehicle headlamp control circuit 100 or may comprise a separate component connected to vehicle headlamp control circuit 100 via a memory interface 107, which may be connected to memory 18 via as a communication bus. Fail safe pictures stored in memory 18 may comprise one or more default pictures or one or more previously-used pictures that were used to drive lighting elements 102 without causing any lighting changes or effects.

In some examples, vehicle headlamp control circuit 100 may be configured to drive the plurality of lighting elements using the first set of values received via first communication interface 105 if the composite intensity associated with the first set of values is below the intensity threshold received over second communication interface 106, and to drive the plurality of lighting elements 102 using a second set of values if the composite intensity associate with the first set of values is above the intensity threshold. In this example, the first set of values may be configured to change the plurality of lighting elements from a low-beam lighting mode to a high-beam lighting mode, but such changes may only occur if the composite intensity associated with the first set of values is below the intensity threshold received over second communication interface 106. The second set of values may be used if the composite intensity associated with the first set of values is above the intensity threshold, and the second set of value, for example, may comprises a previously-used set of values that were previously used to drive the plurality of lighting elements, or the second set of values comprises a default set of values stored in memory 18.

In other examples, vehicle headlamp control circuit 100 may be configured to drive the plurality of lighting elements using the first set of values received via first communication interface 105 if the composite intensity associated with the first set of values is above the intensity threshold received over second communication interface 106 and to drive the plurality of lighting elements using a second set of values of the composite intensity associate with the first set of values is below the intensity threshold. In this example, the first set of values may be configured to change the plurality of lighting elements from a high-beam lighting mode to a low-beam lighting mode, but such changes may only occur if the composite intensity associated with the first set of values is below the intensity threshold received over second communication interface 106. Again, the techniques of this disclosure may be useful whenever lighting changes are made, such as to achieve brightness increases low beam to high beam, to achieve brightness decreases from high beam to low beam, to shape light output so as to achieve glare reductions perceived by the operators of other vehicles, to enhance illumination of one or more objects, to adjust or project visual aids or guiding elements in order to help the vehicle operator, to project one or more symbols, to project guiding lines for the vehicle operator, to shape light projected by lighting elements 102, to increase light intensity of a portion of light projected by lighting elements 102, or to achieve other effects.

In addition to providing control redundancy, the intensity threshold received via second communication interface 106 may also be used for additional purposes, such as for checking whether the actual amount of current used to drive lighting elements 102, e.g., after a lighting change, is consistent with the expect amount of current. For example, when changing from a lower light output mode to a higher output mode, in response to driving the plurality of lighting elements using the first set of values, vehicle headlamp control 100 may be further configured to measure an actual amount of current used to drive the plurality of lighting elements 102 using the first set of values, and generate an alert or change operation so as to drive the plurality of lighting elements using the second set of values, if the actual amount of current used to drive the plurality of lighting elements using the first set of values is above the intensity threshold. Of course, such measurements could also be used to generate an alert or change operation if the actual amount of current used to drive the plurality of lighting elements using the first set of values is below the intensity threshold for the situation of changing from a higher light output mode to a lower output mode.

Furthermore, in some examples, additional thresholds can be used and checked. For example, in the case where the first set of values are configured to change the plurality of lighting elements 102 from a low-beam lighting mode to a high-beam lighting mode, an additional threshold may be checked to ensure that the expected high-beam lighting mode is sufficiently bright. In this case, the intensity threshold received via second communication interface 106 may comprise a first intensity threshold and circuit 100 may be further configured to generate an alert in response to the composite intensity associated with the first set of values being below a second intensity threshold. The alert, for example, may be sent from vehicle headlamp control circuit 100 to control source 12 in order to identify a possible problem with high beam light output.

In different examples, the intensity threshold may define threshold of total current, a duty cycle, a brightness level, or another value indicative of light output intensity. In the case where the intensity threshold comprises a current threshold, for example, the composite intensity may be defined by a composite amount of current associated with driving the plurality of lighting elements 102 with the first set of values.

In other cases where the intensity threshold is defined based on a duty cycle, a brightness level, the composite intensity may be defined similarly to the threshold so as to provide a useful comparison.

The first communication interface 105 may be configured to receive the first signal on a frame-by frame basis according to a video protocol. The second communication interface 106 may be configured to receive the second signal in response to a desired change in the plurality of lighting elements from a first lighting mode to a second lighting mode. This desired change may be user-controlled, in which case, the second signal may be sent in response to user input. In other examples, the desired change may be automatically controlled, and based on images detected by vehicle cameras, based on changes in vehicle operation, or based on other factors such as vehicle turning (where edge lighting may be enhanced) or user-selected signaling (e.g., user selected turn signals).

In some examples, a single threshold may be defined for the entire set of lighting elements 102. In this case, the first set of values may comprise a bitmap for driving all of lighting elements 102. In other examples, multiple different thresholds may be defined for different portions or subsets of lighting elements 102. When multiple thresholds are defined for different portions of lighting elements 102, more advanced checking may be performed by circuit 100. For example, vehicle headlamp control 100 may check the brightness of sub-parts or portions lighting elements 102 (e.g. a center part, a particular number of rows/columns/quadrants, a top portion and a bottom portion, or other defined portions) with several, independently adjustable or controllable, thresholds. In some examples, the threshold may be used to check if pixels above or outside a defined cut of line are activated. Lights above or outside a defined cutoff line, for example, may be associated with particular lighting modes such as high beam, edge lighting for turns, object detection mode, and/or lighting to present or illuminate navigational lines or symbols.

In the example where the threshold is associate with a portion of lighting elements 102, the portion may comprise a first portion, the intensity threshold may comprise a first intensity threshold, and the composite intensity may comprise a first composite intensity. In this case, the first communication interface 105 may be further configured to receive a third signal comprising a second set of values for driving a second portion of lighting elements associated lighting elements 102, and the second communication interface may be further configured to receive a fourth signal comprising a second intensity threshold. Vehicle headlamp control circuit 100 may be configured to determine a second composite intensity associated with the second set of values, and drive the second portion of lighting elements associated with lighting elements 102 using the second set of values if the second composite intensity associated with the second set of values satisfies the second intensity threshold.

Figure 2:
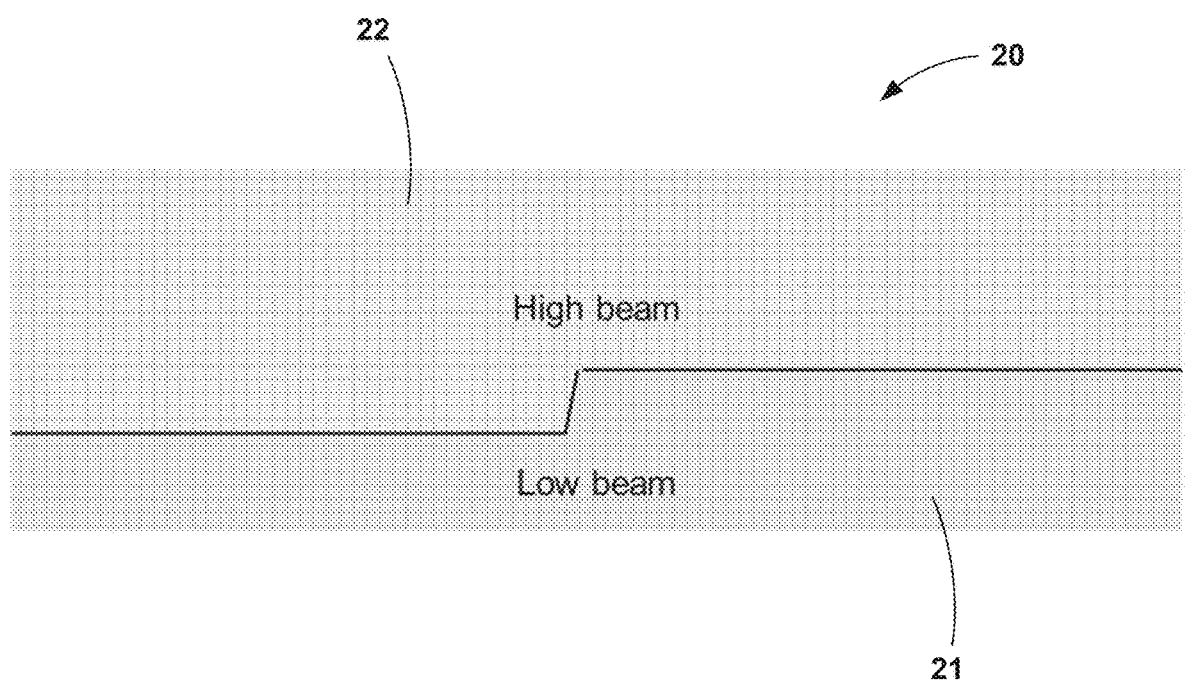
FIG. 2 is a conceptual diagram of a right-side vehicle headlamp comprising a matrix of light emitting diodes (LEDs) showing a low beam setting with only a portion of the LEDs active and a high beam setting with all of the LEDs active.

FIG. 2 is a conceptual diagram of a right-side vehicle headlamp 20 comprising a matrix of LEDs that are individually controllable. By activating different sets of the LEDs, different types of lighting can be achieved. For example, in a low beam lighting mode, the right-side vehicle headlamp 20 may be controlled to activate subset 21 of the LEDs of vehicle headlamp. Alternatively, in a high beam lighting mode, all of the LEDs may be active (i.e., both subset 21 and subset 22). Thus, when changing from a low beam mode to a high beam mode, subset 22 may be activated, which may cause the overall current used by vehicle headlamp 20 to increase. By using intensity thresholds and comparing them to expected composite intensity associated with an image (bitmap) used to drive headlamp 20, safety can be enhanced and unwanted or undesirable changes in lighting can be reduced or avoided.

FIGS. 3A-3F are conceptual diagrams of left-side and right-side vehicle headlamps in some example lighting modes where different sets of LEDs are active. Again, the techniques of this disclosure may be used to monitor and control lighting mode changes, such as changes to and from different lighting modes illustrated in FIGS. 3A-3F.

FIG. 3A illustrates one example low beam lighting mode where left-side vehicle headlamp 30A illuminates subset 301A and does not illuminate subset 302A. Similarly, in this example low beam lighting mode, right-side vehicle headlamp 30B illuminates subset 301A and does not illuminate subset 302A.

FIG. 3B illustrates an example high beam lighting mode where left-side vehicle headlamp 31A illuminates the entire set 305A of LEDs. Similarly, in the example high beam lighting mode of FIG. 3B, right-side vehicle headlamp 31B illuminates the entire set 305B of LEDs.

Figure 3C:
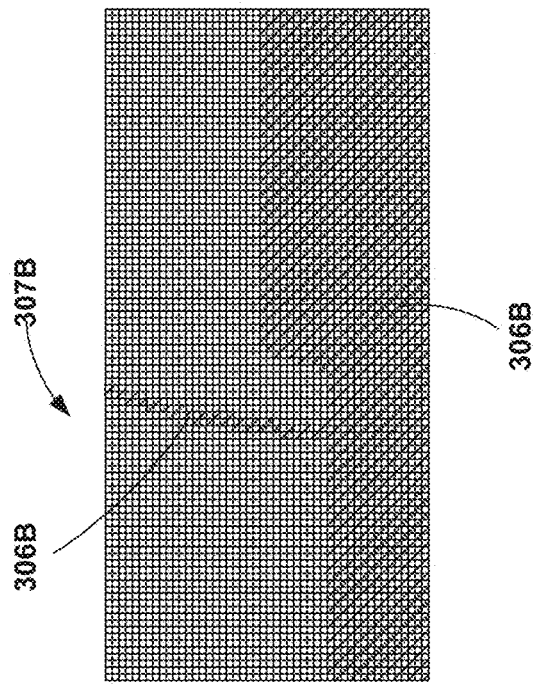

FIG. 3C another possible lighting mode where left-side vehicle headlamp 32A illuminates a first subset 306A of LEDs similar to a low beam lighting mode and further illuminates a second subset 307A of LEDs so as to provide or illuminate one or more guidelines. Similarly, in this example guide lighting mode, right-side vehicle headlamp 32B illuminates a first subset 306B similar to a low beam lighting mode and further illuminates a second subset 307B of LEDs so as to provide or illuminate one or more guidelines.

Figure 3D:
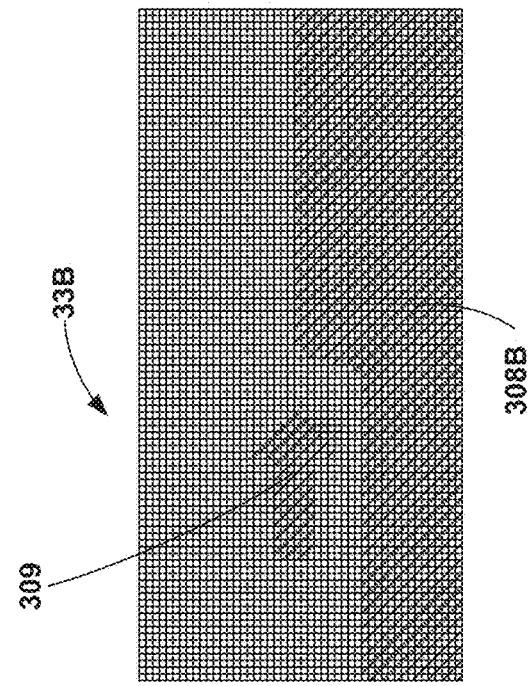

FIG. 3D another possible lighting mode where left-side vehicle headlamp 33A illuminates a first subset 308A of LEDs similar to a low beam lighting mode. The example lighting mode shown in FIG. 3D may include the illumination of one or more symbols (e.g., a turn arrow). In this example, right-side vehicle headlamp 33B illuminates a first subset 308B similar to a low beam lighting mode and further illuminates a second subset 309 of LEDs so as to provide or illuminate a symbol.

FIG. 3E another possible lighting mode where left-side vehicle headlamp 34A illuminates a first subset 310A of LEDs similar to a low beam lighting mode. The example lighting mode shown in FIG. 3E may include the illumination of one or more objects or road hazards, e.g., in response to object detection. In this example, right-side vehicle headlamp 34B illuminates a first subset 310B similar to a low beam lighting mode and further illuminates a second subset 312 of LEDs so as to illuminate an object or road hazard, possibly in response to object detection based on a vehicle camera system.

FIG. 3F another possible lighting mode (e.g., a safe lighting mode with lower intensity than low beam) whereby a small subset of LEDs 311A and 311B are illuminated by left-side vehicle headlamp 36A and right-side vehicle headlamp 36B.

FIGS. 3A-3F are merely examples of a wide variety of lighting modes that can be achieved using a pixelized light source. The techniques of this disclosure may be used when changing between the modes shown in FIGS. 3A-3F. However, other types of lighting modes could also be defined and used, such as modes that provide for edge lighting during a turn, display other types of symbols, adaptive and changing modes based on object detection, or other modes. The techniques of this disclosure may be useful anytime a lighting change occurs in a pixelated vehicle headlamp.

The intensity threshold or thresholds may be defined or adjusted depending on the mode or use case. This can be done, e.g., via register setting or mode change communicated to second communication interface 106 via control signals. Although this disclosure describes a current threshold in detail, depending on the implementation the threshold can be set as a duty cycle, a current level, a brightness level or anything indicative of LED brightness associated with the vehicle headlamps. The threshold can either be set independently or synchronized to the video frame.

Figure 4:
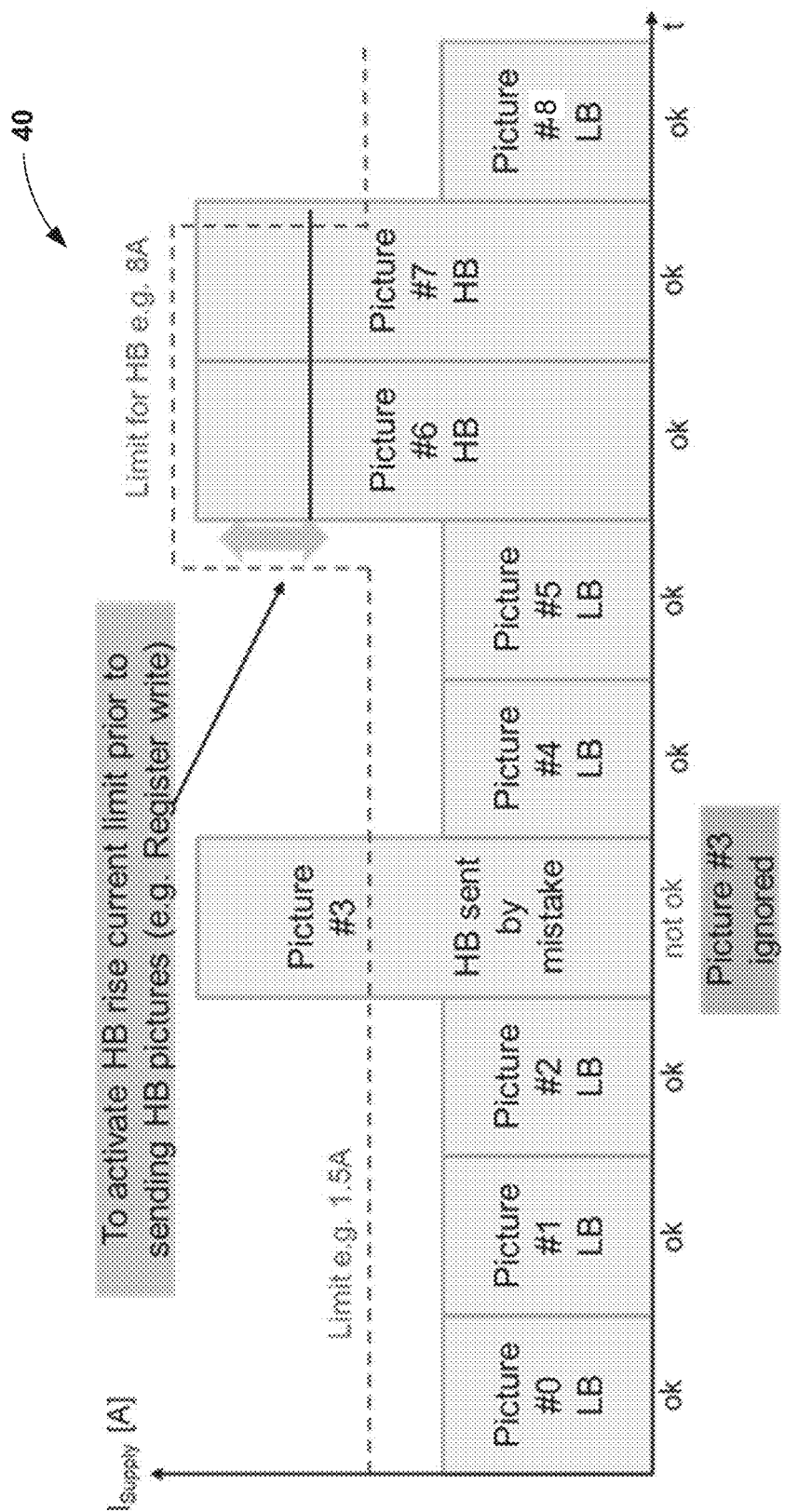
FIG. 4 is timing diagram showing the communication of pictures (i.e., bitmaps) to an LED circuit where a high beam picture is communicated by mistake.

FIG. 4 is timing diagram 40 showing the communication of pictures (i.e., bitmaps) to an LED circuit (or another pixelated light source) where a high beam picture is communicated by mistake. In timing diagram 40, several low beam pictures are sent and then interrupted by one high beam picture (i.e., picture #3 shown in FIG. 4). In the example of FIG. 4, during low beam mode associated with pictures 0-5, a current threshold may be defined as 1.5 Amp. Since picture #3 would define a composite current greater than the 1.5 Amp threshold, picture #3 can be ignored or discarded by the LED control circuit, and a default image or another version of picture #2 may be used by the LED control circuit to drive the LEDs.

According to the timing diagram of FIG. 4, in order to activate a lighting mode change from low beam to high beam, an intensity threshold change is needed. The intensity threshold limit for high beam, for example, may increase from 1.5 Amp to 8 Amps, which may occur prior to receipt of picture #6. Pictures #6 and #7 may cause a change from a low beam mode to a high beam mode, and this change can be confirmed by checking whether the composite current associated with picture #6 and with picture #7 is below the current threshold. Since the current threshold is increased from 1.5 Amp to 8 Amps prior to receiving pictures #6 and #7, the change to high beam mode is allowed, and pictures #6 and #7 may be used by the LED control circuit to drive the LEDs.

Also, according to the timing diagram of FIG. 4, for a lighting mode change back to low beam from high beam, the intensity threshold may again be changed back to 1.5 Amp prior to receiving picture #8. Picture #8 may be used by to the LED control circuit to drive the LEDs since the composite intensity associated with picture #8 satisfies the low beam threshold by being less than 1.5 Amp.

Figure 5:
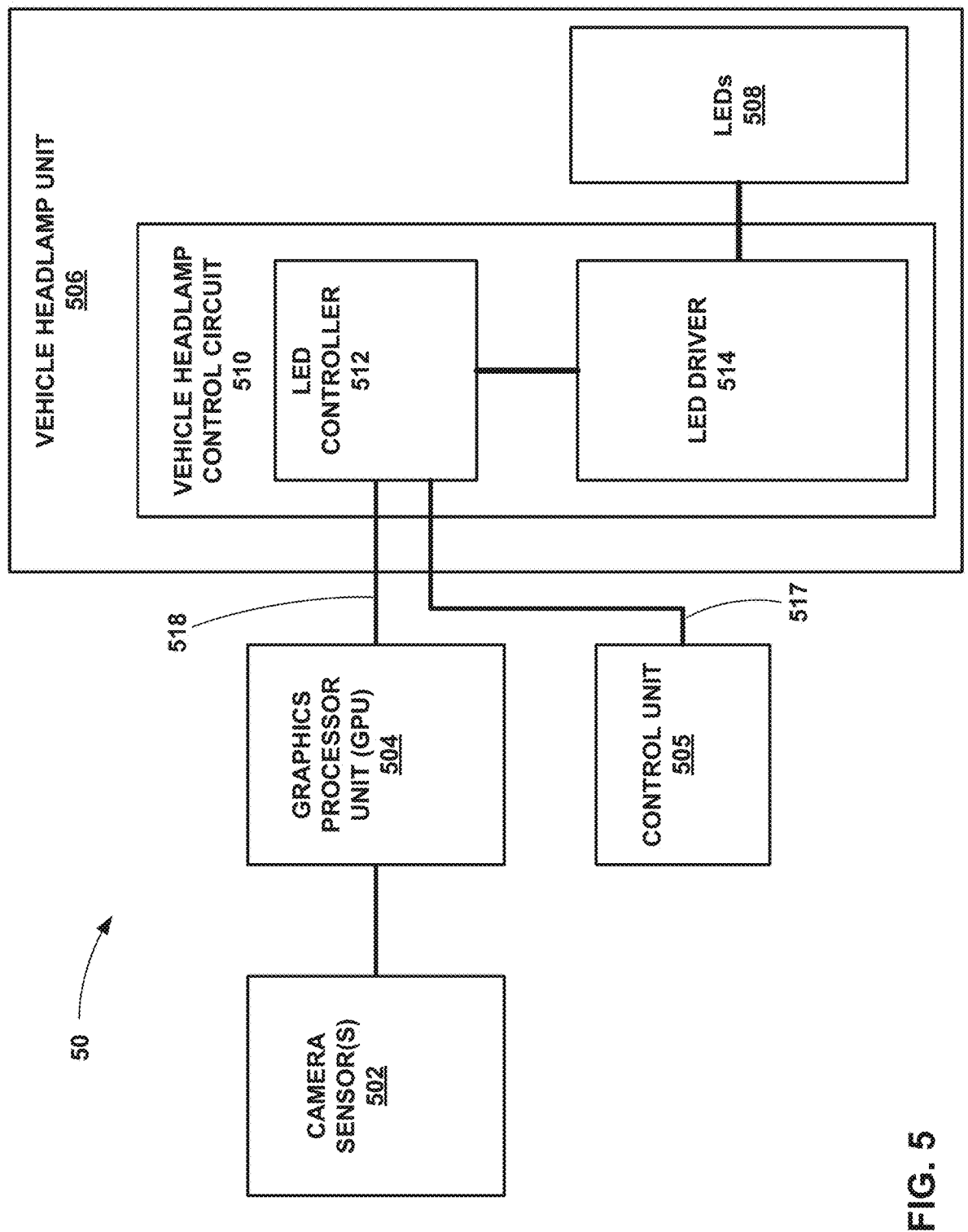
FIG. 5 is a block diagram of an example system for advanced vehicle headlamps.

FIG. 5 is a block diagram of an example system for advanced vehicle headlamps. In particular, FIG. 5 illustrates an adaptive vehicle lighting system 50 comprising one or more camera sensors 502 configured to capture video data associated with a scene illuminated by the vehicle lighting system, a graphics processing unit (GPU) 504 that processes the video data, and a vehicle headlamp unit 506 including a set of LEDs 508 that may be arranged in a two-dimensional matrix, and a vehicle headlamp control circuit 510 configured to control the LEDs 508. Vehicle headlamp control circuit 510 may comprise a separate circuit relative to LEDs 508 or alternatively, these components could be combined into a common circuit to define a fully integrated vehicle headlamp unit 506 formed in a common silicon structure.

Vehicle headlamp control circuit 510 may comprise an LED controller 512 configured to receive the processed video data from the GPU a first interface 518, which may comprise high speed video interface, or a differential interface commonly used in automobile circuit applications. In addition, in accordance with this disclosure, LED controller 512 may be further configured to receive an intensity threshold via a control interface 517 from a control unit 505. LED controller 512 may be configured to determine a composite intensity associated with an image of video data, and cause LED driver 514 to drive LEDs 508 using the image of video data if the composite intensity associated with the first set of values satisfies the intensity threshold LED driver 514 may comprise a DC-DC converter or other power device that is configured to drive the LEDs based at least in part on the processed video data. In some cases, LED driver 514 may comprise one or more DC to DC power converters utilizing parallel sets of linear current sources to deliver precise amounts of current to a load for different modes. In such examples, as the current demand increases, additional linear current sources may be used by LED driver 514.

GPU 504 may process raw video data and generate processed video data that is processed so as to achieve desired lighting effects by LEDs. Such processing by GPU 504, for example, may be based on navigation information collected or presented by the vehicle, based on object detection, or based on other factors. For example, camera sensors 502 may deliver real time video in raw format to GPU 504, and GPU may process the raw video to identify scenes, roadways, features, obstacles, or other elements within the raw video data. In some examples, GPU may perform one or more object detection algorithms on the raw video data in order to identify objects or elements within the video data captured by camera sensors 502. Based on such object detection algorithms, GPU 504 may modify the raw video data so as to generate processed video data, and the processed video data may be modified relative to the raw video data in a way that can achieve desired lighting effects by LEDs 508.

For example, object detection may be used to identify oncoming traffic, road hazards, or obstacles. Such object detection may be used to modify the raw video data such that the processed video data has pixelated data adjustments relative to the raw video data. The pixelated data adjustments may adjust the raw video data in places where objects are detected in the field of view. In this way, the processed data itself may be changed in a way that can help to achieve lighting effects by LEDs 508, such as glare reductions perceived by the operators of other vehicles, illumination of one or more objects, presentation of visual aids or guiding elements in order to help the vehicle operator projections of one or more symbols, projections of guiding lines for the vehicle operator, light shaping, reductions in light intensity, presentation of symbols, shapes or symbols, or the presentation of other effects. Other desirable lighting effects may also include the illumination of Trademarks or symbols, such as for presenting the driver with a welcome message or lighting effects when the vehicle is started or when the vehicle is in a parked mode.

Referring again to the object detection, GPU 504 may process raw video data and identify oncoming traffic in the raw video data. In this case, such objects may be used to cause specific pixelated intensity reductions such that LEDs 508 achieve glare reductions to the oncoming traffic. As another example, GPU 504 may process raw video data to identify an object or road hazard, such as on animal on the roadway, and in this case, objects may be used to cause specific pixelated intensity increases such that LEDs 508 illuminate the object with more light. The raw video data may comprise as a bit-map of RGB intensity values, and the processed video data may comprise a similar bit map of RGB intensity values that includes intensity adjustments to those pixels associated with the object detection.

Although RGB intensity values are discussed herein with regard to the video data, other video data formats could be such, such as formats that use chrominance and luminance values, LUV formats, CMYK formats, vectorized video data formats, or other video data formats. A bitmap of intensity values can be viewed as a bitmap of a video image, and can also be viewed as a bitmap of intensity values used to drive individual pixels of a matrix of LEDs. Thus, by processing a bitmap of an image, GPU can essentially define a new bitmap of that image that is modified to achieve object detection, glare reduction, or other effects when that same bitmap is used to drive LEDs 508.

As mentioned above, first interface 518 may comprise high speed video interface, or a differential interface commonly used in automobile circuit applications. Examples of first interface 518 may include an ethernet interface; a gigabit multimedia serial link (GMSL) interface; a controller area network (CAN) bus interface; a controller area network-flexible data (CAN-FD) bus interface; an interface defined according to a FlexRay protocol; a link defined according to a low voltage differential signaling (LVDS) standard, such as FPD-Link, FlatLink, FPD-Link II, FPD-Link III, and OpenLDI; or a controller area network-extra-large (CAN-XL) bus interface.

In contrast to first interface 518, which communicates video data to vehicle headlamp unit 506, second interface 517 may comprise a control signal interface. Second interface 517 may be used to communicate an intensity threshold from a control unit 505 to LED controller 512. Second interface 517 may also control one or more other functions of the vehicle headlamp, as well as perform or facilitate diagnosis. For safety uncritical applications this second interface 517 could easily be disabled (either by actually disabling the its functionality or by simply setting the thresholds to values that will be satisfied by any types of images used to drive LEDs 508). In still other examples, the control interface 517 used to send the intensity threshold(s) could also come directly from GPU 504 as a separate communication interface from GPU 504 to LED controller 512 (i.e., separate from first interface 518).

In any case, accordingly to this disclosure, LED controller 512 may be configured to determine a composite intensity associated with an image of video data, and cause LED driver 514 to drive LEDs 508 using the image of video data if the composite intensity associated with the first set of values satisfies the intensity threshold. If not, LED controller 512 may cause LED driver 514 to drive LEDs 508 using alternative data, such as a previously used "safe" video frame or a default "safe" video frame saved in a memory (not shown in FIG. 5).

In addition to the object detection or other processing that may be performed by GPU 504, in some examples, additional video data adjustments can be made, such as so-called Gamma corrections to the video data. In some examples, Gamma corrections are performed by GPU 504 after the initial processing of the video data discussed above. In some examples, Gamma corrections are performed by LED controller 512 after GPU 504 processing of the video data discussed above. In still other examples, LED driver 514 may be configured to perform the Gamma corrections. Gamma corrections or other video data adjustments may be used to further improve the lighting that is achieved by LEDs 508. Processed and adjusted video data (e.g. data that is processed by GPU 504 and then adjusted with Gamma corrections) may still comprise a bit map of RGB intensity values (or other formats) that includes intensity adjustments to those pixels associated with the object detection, intensity adjustments to those pixels used for presenting guiding lines or guiding features, as well as Gamma correction adjustments. LED driver 514 may then use the processed and adjusted video data (e.g., a bitmap) to drive LEDs 508, which may comprise a matrix of LEDs having pixels that correspond to the intensity values defined in the bitmap of video data. According to this disclosure, such images or bitmaps of RGB intensity values may only be used if the composite intensity associated with those values satisfies the threshold set by control unit 505 and communicated via second interface 517.

The use of intensity thresholds according to this disclosure may provide an additional level of safety to vehicle headlamp operation, ensuring that only allowed light patterns can be displayed, without adding excessive complexity inside the light source driver. A check can be performed by the light source controller when it receives the picture information via a first interface and a threshold via a second interface. The check can be performed by calculating the composite brightness associated with the received picture. This composite brightness can then be compared to an adjustable threshold communicated to the light source controller via a separate interface from that used to communicate the picture. If the picture is too bright, it may be ignored and the device may continue to use the last valid picture to drive the lighting elements or use a defined fail safe picture. Again, the brightness check can be refined to check the brightness of the complete matrix of pixelated lighting elements with a single threshold, the brightness of sub-parts of the matrix (e.g. center part, number of rows/columns/quadrants) with several, independently adjustable, thresholds, or in specific places of the matrix to check if pixels above, below, or beyond a defined cut of line are activated.

Figure 6:
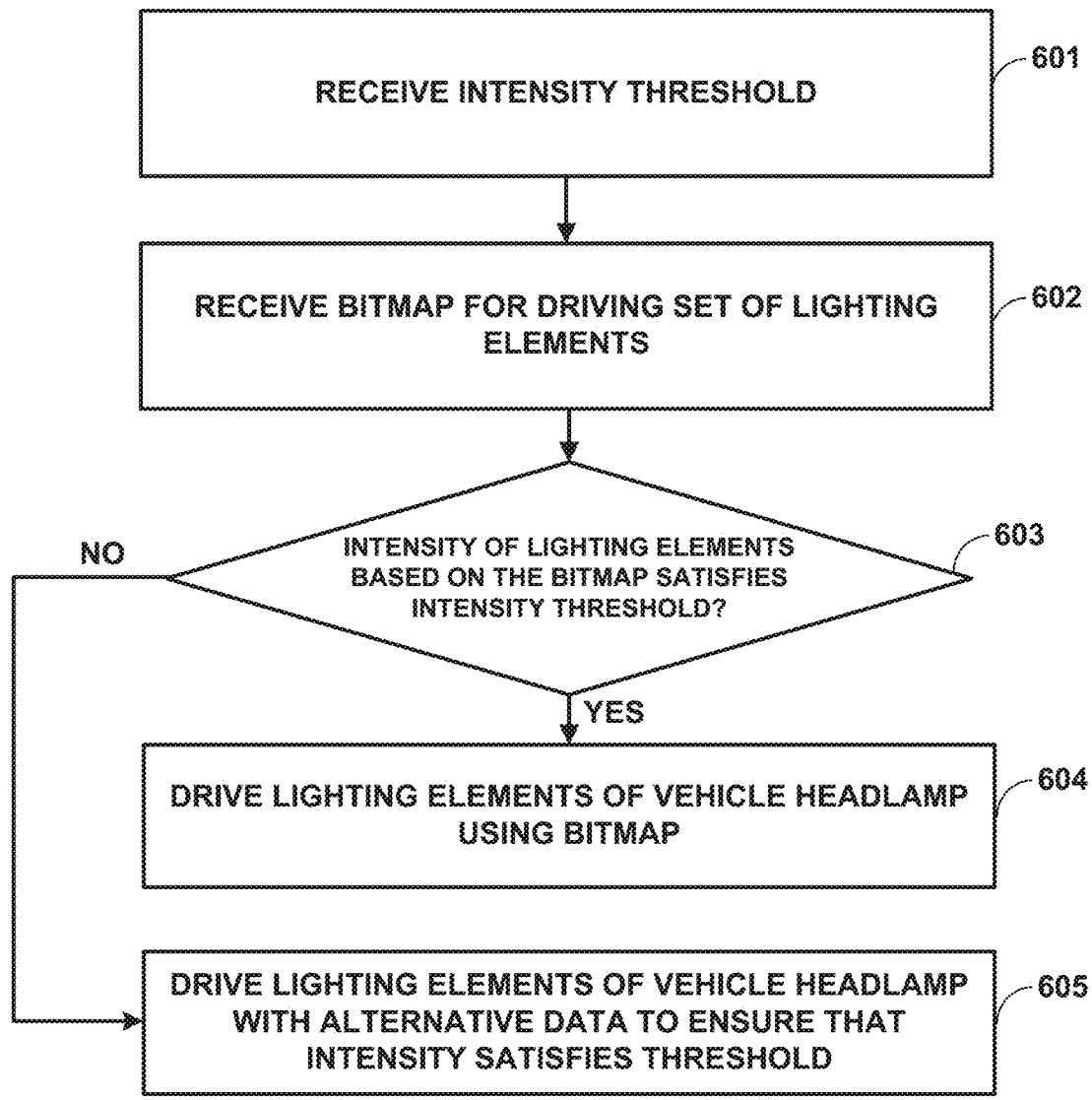
FIGS. 6 and 7 are flow diagrams consistent with techniques according to this disclosure.
Figure 7:
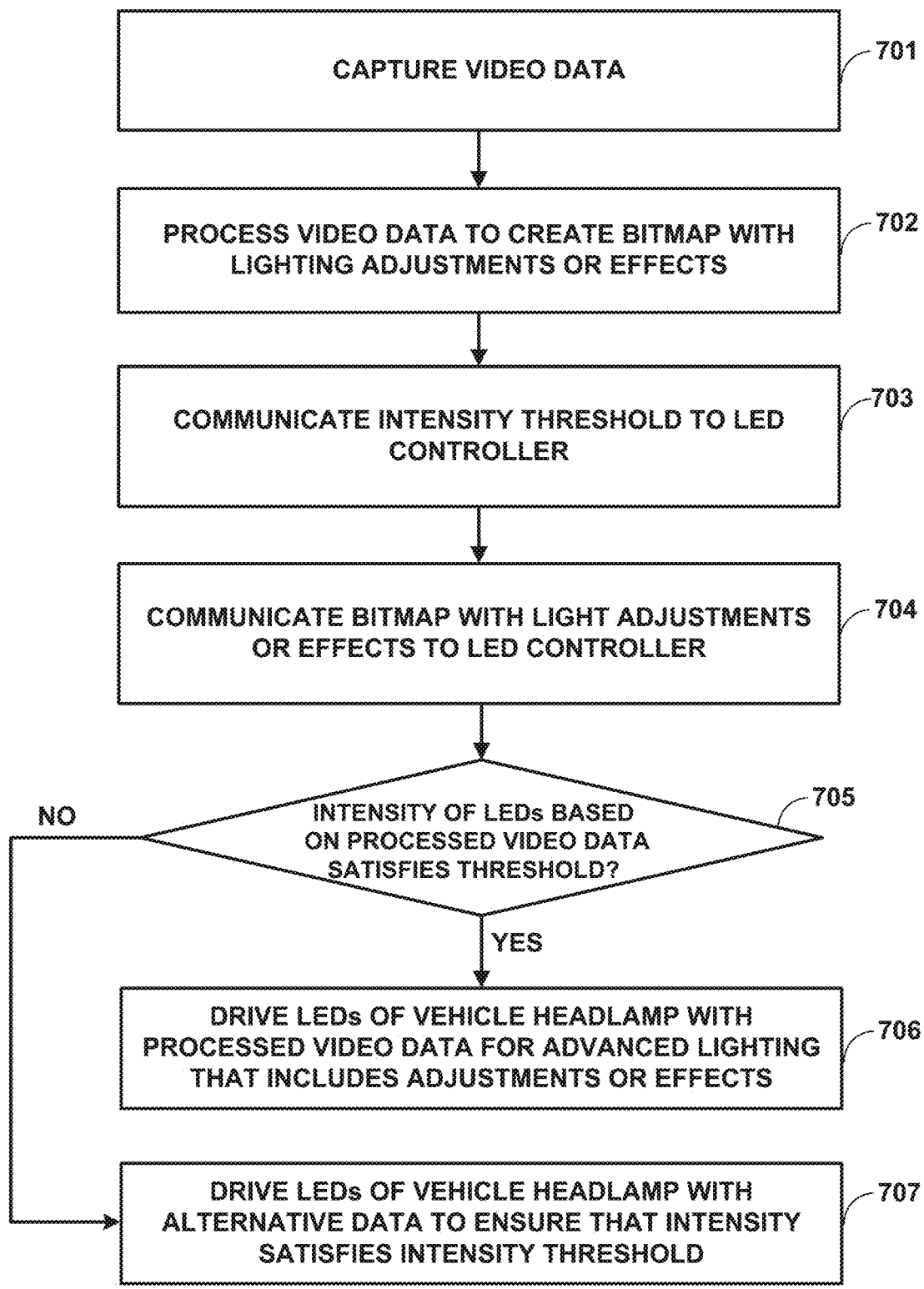

FIGS. 6 and 7 are flow diagrams consistent with techniques according to this disclosure. FIG. 6 will be described from the perspective of vehicle headlamp control circuit 100 of FIG. 1, although other circuits could be used to perform the techniques. As shown in FIG. 6, vehicle headlamp control circuit 100 receives an intensity threshold via a control interface (601). In addition, vehicle headlamp control circuit 100 receives a bitmap for driving lighting elements 102 via a video interface (602). In particular, vehicle headlamp control circuit 100 receives the bitmap at a first communication interface 105 of control circuit 100 and receives the intensity threshold at a second communication interface 106 of control circuit 100. Vehicle headlamp control circuit 100 determines a total intensity associated with driving the lighting elements using the bitmap and determines if the intensity of the lighting elements based on the bitmap satisfies an intensity threshold (603). If the intensity of the lighting elements based on the bitmap satisfies the threshold (yes branch of 603), then vehicle headlamp control circuit 100 drives lighting elements 102 using the bitmap (604). However, if the intensity of the lighting elements based on the bitmap does not satisfy the threshold (no branch of 603), then vehicle headlamp control circuit 100 drives lighting elements 102 using alternative data (605). The alternative data, for example, may comprise a previously-used bitmap (i.e., a previously received frame of video data used for driving lighting elements) or a default and safe bitmap stored in memory 18.

FIG. 7 will be described from the perspective of adaptive vehicle lighting system 50 shown in FIG. 5 although similar techniques could be used with other systems, such as systems with other types of vehicle headlamps with individually controllable lighting elements. According to the technique of FIG. 7, camera sensors 502 of adaptive vehicle lighting system 50 capture video data associated with a driving vehicle (701). GPU 504 may process the video data so as to create a bitmap with adjustments or effects (702). For example, GPU 504 may use captured video data associated with the road or road conditions in order to add adjustments or effects to a bitmap that is used to drive individually controllable LEDs 508. Referring again to FIGS. 3C-3E, for example, guiding lines 307A and 307B within the bitmap, one or more symbols 309 in within the bitmap, or object illumination of a specific subset of lighting elements 312 at specific places in within the bitmap may be added by GPU in order to define such lighting features, adjustments, or effects in the bitmap. The lighting features, adjustments, or effects may be based on captured images of road conditions, and these features, adjustments, or effects may comprise additionally-active LEDs that are activated in addition to those shown in the low beam setting shown in FIG. 3A.

A control unit 505 (or possibly GPU 504) communicates an intensity threshold to LED controller 512 via a control interface 517. In addition, GPU 504 communicates the bitmap with the lighting features, adjustments, or effects to LED controller 512 via video interface 516. LED controller 512 determines a total intensity associated with driving LEDs 508 using the bitmap and determines if the intensity of LEDs 508 based on the bitmap satisfies an intensity threshold (705). If the intensity of the LEDs 508 based on the bitmap satisfies the threshold (yes branch of 705), then LED controller 512 causes LED driver 514 to drive LEDs 508 using the bitmap (706). However, if the intensity of LEDs 508 based on the bitmap does not satisfy the threshold (no branch of 705), then LED controller 512 causes LED driver 514 to drive LEDs 508 using alternative data (707). Again, for example, the alternative data may comprise a previously-used bitmap (i.e., a previously received bitmap used for the driving lighting elements) or a default and safe bitmap stored in a memory (not shown) associated with vehicle headlamp control circuit 510.

The following examples may illustrate one or more aspects of the disclosure.

Example 1: A vehicle headlamp control circuit configured to control a vehicle headlamp comprising a plurality of lighting elements, the vehicle headlamp control circuit that includes a first communication interface configured to receive a first signal comprising a first set of values for driving the plurality of lighting elements; and a second communication interface configured to receive a second signal comprising an intensity threshold, wherein the vehicle headlamp control circuit is configured to determine a composite intensity associated with the first set of values and drive the plurality of lighting elements using the first set of values if the composite intensity associated with the first set of values satisfies the intensity threshold.

Example 2: The vehicle headlamp control circuit of example 1, wherein the vehicle headlamp control circuit is configured to drive the plurality of lighting elements using the first set of values if the composite intensity associated with the first set of values is below the intensity threshold and to drive the plurality of lighting elements using a second set of values if the composite intensity associate with the first set of values is above the intensity threshold.

Example 3: The vehicle headlamp control circuit of example 1 or 2, wherein the second set of values comprises a previously-used set of values that were previously used to drive the plurality of lighting elements.

Example 4: The vehicle headlamp control circuit of example 1 or 2, wherein the second set of values comprises a default set of values.

Example 5: The vehicle headlamp control circuit of any of examples 1-4, wherein in response to driving the plurality of lighting elements using the first set of values, the vehicle headlamp control circuit is further configured to: measure an actual amount of current used to drive the plurality of lighting elements using the first set of values: and generate an alert or change operation so as to drive the plurality of lighting elements using the second set of values, if the actual amount of current used to drive the plurality of lighting elements using the first set of values is above the intensity threshold.

Example 6: The vehicle headlamp control circuit of any of examples 1-5, wherein the intensity threshold is a first intensity threshold and wherein the vehicle headlamp control circuit is further configured to generate an alert in response to the composite intensity associated with the first set of values being below a second intensity threshold.

Example 7: The vehicle headlamp control circuit of any of examples 1 or 3-6, wherein the vehicle headlamp control circuit is configured to drive the plurality of lighting elements using the first set of values if the composite intensity associated with the first set of values is above the intensity threshold and to drive the plurality of lighting elements using a second set of values of the composite intensity associate with the first set of values is below the intensity threshold.

Example 8: The vehicle headlamp control circuit of any of examples 1-6, wherein the first set of values are configured to change the plurality of lighting elements from a low-beam lighting mode to a high-beam lighting mode.

Example 9: The vehicle headlamp control circuit of example 1-6 or 8, wherein the first set of values are configured to change the plurality of lighting elements from a lower intensity lighting mode to a higher intensity lighting mode.

Example 10: The vehicle headlamp control circuit of example 1 or 3-6, wherein the first set of values are configured to change the plurality of lighting elements from a higher intensity lighting mode to a lower intensity lighting mode.

Example 11: The vehicle headlamp control circuit of any of examples 1-10, wherein the intensity threshold comprises a current threshold.

Example 12: The vehicle headlamp control circuit of example 11, wherein the composite intensity is defined by a composite amount of current associated with driving the plurality of lighting elements with the first set of values.

Example 13: The vehicle headlamp control circuit of any of examples 1-12, wherein the first communication interface is configured to receive the first signal on a frame-by frame basis according to a video protocol, and the second communication interface is configured to receive the second signal in response to a desired change in the plurality of lighting elements from a first lighting mode to a second lighting mode.

Example 14: The vehicle headlamp control circuit of any of examples 1-13, wherein the plurality of lighting elements comprises one or more of: a plurality of individually controllable light emitting diodes (LEDs) arranged in a two-dimensional matrix to define the vehicle headlamp; and a plurality of individually controllable lighting elements that comprise micro mirrors arranged in a two-dimensional matrix to define the vehicle headlamp.

Example 15: The vehicle headlamp control circuit of any of examples 1-14, wherein the first set of values comprise a bitmap for driving a matrix of lighting elements that define the vehicle headlamp.

Example 16: The vehicle headlamp control circuit of examples 1-14, wherein the first set of values comprise a bitmap for driving a portion of lighting elements associated with a matrix of lighting elements that define the vehicle headlamp.

Example 17: The vehicle headlamp control circuit of example 16, wherein the portion comprises a first portion, the intensity threshold comprises a first intensity threshold, and the composite intensity comprises a first composite intensity, wherein: the first communication interface is further configured to receive a third signal comprising a second set of values for driving a second portion of lighting elements associated with the matrix of lighting elements that define the vehicle headlamp; the second communication interface is further configured to receive a fourth signal comprising a second intensity threshold; and the vehicle headlamp control circuit is further configured to determine a second composite intensity associated with the second set of values, and drive the second portion of lighting elements using the second set of values if the second composite intensity associated with the second set of values satisfies the second intensity threshold.

Example 18: A method of controlling a vehicle headlamp that includes receiving a first signal that comprises a first set of values for driving a plurality of lighting elements of the vehicle headlamp; receiving a second signal comprising an intensity threshold; determining a composite intensity associated with the first set of values; and driving the plurality of lighting elements using the first set of values if the composite intensity associated with the first set of values satisfies the intensity threshold.

Example 19: The method of example 18, further comprising driving the plurality of lighting elements using a second set of values if the composite intensity associated with the first set of values does not satisfy the intensity threshold.

Example 20: The method of example 18 or 19, wherein the second set of values comprise one of: a previously-used set of values that were previously used to drive the plurality of lighting elements; and a default set of values.

Example 21: A headlamp unit for a vehicle, the headlamp unit that includes a plurality of lighting elements; and a vehicle headlamp control circuit configured to control the plurality of lighting elements. The vehicle headlamp control circuit comprises a first communication interface configured to receive a first signal comprising a first set of values for driving the plurality of lighting elements; and a second communication interface configured to receive a second signal comprising an intensity threshold, wherein the vehicle headlamp control circuit is configured to determine a composite intensity associated with the first set of values, drive the plurality of lighting elements using the first set of values if the composite intensity associated with the first set of values satisfies the intensity threshold, and drive the plurality of LEDs using a second set of values if the composite intensity associated with the first set of values does not satisfy the intensity threshold.

Various aspects have been described in this disclosure. These and other aspects are within the scope of the following claims.

The invention claimed is:

1. A vehicle headlamp control circuit configured to control a vehicle headlamp comprising a plurality of lighting elements, the vehicle headlamp control circuit comprising:
 a first communication interface configured to receive a first signal comprising a first set of values for driving the plurality of lighting elements, wherein the first set of values define a bitmap of intensity values for driving the plurality of lighting elements according to a lighting mode in the vehicle headlamp circuit; and
 a second communication interface configured to receive a second signal comprising an intensity threshold, wherein the intensity threshold comprises a value indicative of light output intensity corresponding to the lighting mode, and wherein the intensity threshold defines a total current, a duty cycle, or a brightness level,
 wherein the vehicle headlamp control circuit is configured to determine a composite intensity associated with the first set of values, determine whether the composite intensity satisfies the intensity threshold, and drive the plurality of lighting elements using the first set of values in response to determining that the composite intensity associated with the first set of values satisfies the intensity threshold.

2. The vehicle headlamp control circuit of claim 1, wherein the vehicle headlamp control circuit is configured to drive the plurality of lighting elements using the first set of values if the composite intensity associated with the first set of values is below the intensity threshold and to drive the plurality of lighting elements using a second set of values if the composite intensity associate with the first set of values is above the intensity threshold.

3. The vehicle headlamp control circuit of claim 2, wherein the second set of values comprises a previously-used set of values that were previously used to drive the plurality of lighting elements.

4. The vehicle headlamp control circuit of claim 2, wherein the second set of values comprises a default set of values.

5. The vehicle headlamp control circuit of claim 2, wherein in response to driving the plurality of lighting elements using the first set of values, the vehicle headlamp control circuit is further configured to:
 measure an actual amount of current used to drive the plurality of lighting elements using the first set of values; and
 generate an alert or change operation so as to drive the plurality of lighting elements using the second set of values, if the actual amount of current used to drive the plurality of lighting elements using the first set of values is above the intensity threshold.

6. The vehicle headlamp control circuit of claim 2, wherein the intensity threshold is a first intensity threshold and wherein the circuit is further configured to generate an alert in response to the composite intensity associated with the first set of values being below a second intensity threshold.

7. The vehicle headlamp control circuit of claim 1, wherein the vehicle headlamp control circuit is configured to drive the plurality of lighting elements using the first set of values if the composite intensity associated with the first set of values is above the intensity threshold and to drive the plurality of lighting elements using a second set of values if the composite intensity associated with the first set of values is below the intensity threshold.

8. The vehicle headlamp control circuit of claim 1, wherein the first set of values are configured to change the plurality of lighting elements from a low-beam lighting mode to a high-beam lighting mode.

9. The vehicle headlamp control circuit of claim 1, wherein the first set of values are configured to change the plurality of lighting elements from a lower intensity lighting mode to a higher intensity lighting mode.

10. The vehicle headlamp control circuit of claim 1, wherein the first set of values are configured to change the plurality of lighting elements from a higher intensity lighting mode to a lower intensity lighting mode.

11. The vehicle headlamp control circuit of claim 1, wherein the intensity threshold comprises a current threshold.

12. The vehicle headlamp control circuit of claim 11, wherein the composite intensity is defined by a composite amount of current associated with driving the plurality of lighting elements with the first set of values.

13. The vehicle headlamp control circuit of claim 1, wherein the first communication interface is configured to receive the first signal on a frame-by frame basis according to a video protocol, and the second communication interface is configured to receive the second signal in response to a desired change in the plurality of lighting elements from a first lighting mode to a second lighting mode.

14. The vehicle headlamp control circuit of claim 1, wherein the plurality of lighting elements comprises one or more of:
 a plurality of individually controllable light emitting diodes (LEDs) arranged in a two-dimensional matrix to define the vehicle headlamp; and
 a plurality of individually controllable lighting elements that comprise micro mirrors arranged in a two-dimensional matrix to define the vehicle headlamp.

15. The vehicle headlamp control circuit of claim 1, wherein the first set of values comprise a bitmap for driving a matrix of lighting elements that define the vehicle headlamp.

16. The vehicle headlamp control circuit of claim 1, wherein the first set of values comprise a bitmap for driving a portion of lighting elements associated with a matrix of lighting elements that define the vehicle headlamp.

17. The vehicle headlamp control circuit of claim 16, wherein the portion comprises a first portion, the intensity threshold comprises a first intensity threshold, and the composite intensity comprises a first composite intensity, wherein:
 the first communication interface is further configured to receive a third signal comprising a second set of values for driving a second portion of lighting elements associated with the matrix of lighting elements that define the vehicle headlamp;
 the second communication interface is further configured to receive a fourth signal comprising a second intensity threshold; and
 the vehicle headlamp control circuit is further configured to determine a second composite intensity associated with the second set of values, and drive the second portion of lighting elements using the second set of values if the second composite intensity associated with the second set of values satisfies the second intensity threshold.

18. A method of controlling a vehicle headlamp, the method comprising:
 receiving a first signal that comprises a first set of values for driving a plurality of lighting elements of the vehicle headlamp, wherein the first set of values define a bitmap of intensity values for driving the plurality of lighting elements according to a lighting mode in the vehicle headlamp circuit;
 receiving a second signal comprising an intensity threshold, wherein the intensity threshold comprises a value indicative of light output intensity corresponding to the lighting mode, and wherein the intensity threshold defines a total current, a duty cycle, or a brightness level;
 determining a composite intensity associated with the first set of values;
 determining whether the composite intensity satisfies the intensity threshold; and
 driving the plurality of lighting elements using the first set of values response to determining that if the composite intensity associated with the first set of values satisfies the intensity threshold.

19. The method of claim 18, further comprising driving the plurality of lighting elements using a second set of values if the composite intensity associated with the first set of values does not satisfy the intensity threshold.

20. The method of claim 19, wherein the second set of values comprise one of:
 a previously-used set of values that were previously used to drive the plurality of lighting elements; and
 a default set of values.

21. A headlamp unit for a vehicle, the headlamp unit comprising:
 a plurality of lighting elements; and
 a vehicle headlamp control circuit configured to control the plurality of lighting elements, the vehicle headlamp control circuit comprising:
 a first communication interface configured to receive a first signal comprising a first set of values for driving the plurality of lighting elements, wherein the first set of values define a bitmap of intensity values for driving the plurality of lighting elements according to a lighting mode in the vehicle headlamp circuit; and
 a second communication interface configured to receive a second signal comprising an intensity threshold, wherein the intensity threshold comprises a value indicative of light output intensity corresponding to the lighting mode, and wherein the intensity threshold defines a total current, a duty cycle, or a brightness level,
 wherein the vehicle headlamp control circuit is configured to determine a composite intensity associated with the first set of values, determine whether the composite intensity satisfies the intensity threshold, drive the plurality of lighting elements using the first set of values response to determining that if the composite intensity associated with the first set of values satisfies the intensity threshold, and drive the plurality of LEDs using a second set of values response to determining that the composite intensity associated with the first set of values does not satisfy the intensity threshold.

* * * * *